United States Patent [19]

Nakayama

[11] Patent Number: 5,197,023
[45] Date of Patent: Mar. 23, 1993

[54] HARDWARE ARRANGEMENT FOR FLOATING-POINT ADDITION AND SUBTRACTION

[75] Inventor: Takashi Nakayama, Tokyo, Japan

[73] Assignee: NEC Corporation, Tokyo, Japan

[21] Appl. No.: 786,335

[22] Filed: Oct. 31, 1991

[30] Foreign Application Priority Data

Oct. 31, 1990 [JP] Japan ................................ 2-296067

[51] Int. Cl.⁵ .............................................. G06F 7/38
[52] U.S. Cl. .................................... 364/748; 364/745
[58] Field of Search ................................ 364/748, 745

[56] References Cited

U.S. PATENT DOCUMENTS

| | | | |
|---|---|---|---|
| 4,994,996 | 2/1991 | Fossum et al. | 364/748 |
| 4,999,803 | 3/1991 | Turrini et al. | 364/748 |
| 5,027,308 | 6/1991 | Sit et al. | 364/748 |
| 5,063,530 | 11/1991 | Ishikawa | 364/748 |
| 5,128,889 | 7/1992 | Nakano | 364/748 |

OTHER PUBLICATIONS

S. F. Anderson, The IBM System/360 Model 91: Floating-Point Execution Unit, IBM Journal—Jan. 1967, pp. 34–53.
American National Standard, IEEE Standard for Binary Floating-Point Arithmetic, Aug., 1985, pp. 7–18.
Computer Magazine, A Proposed Standard for Binary Floating-Point Arithmetic, The Institute of Electrical and Electronics Engineers, 1981.

*Primary Examiner*—Tan V. Mai
*Attorney, Agent, or Firm*—Whitham & Marhoefer

[57] ABSTRACT

A hardware arrangement for executing floating-point execution of addition and subtraction is supplied with two floating-point numbers each of which includes an exponential, a fraction represented by an absolute value and a sign bit indicating a sign of the fraction. The arrangement implements rounding on an execution result. In parallel operations, a floating-point execution is performed wherein no bit shifting is needed for normalization on an execution result of the two floating-point numbers. In parallel operations, a floating-point execution is performed wherein bit shifting to the right or the left by one bit is required for normalization on an execution result of the two floating-point numbers, and a floating-point execution wherein bit shifting to the left by more than two bits is required for normalization on an execution result of the two floating-point numbers. A selector is arranged to select an output of one of the first, second and third results according to upper bits of a result derived from executing the fractions in the first-mentioned floating-point execution.

7 Claims, 10 Drawing Sheets

FIG. 1A
PRIOR ART

SINGLE PRECISION FORMAT

FIG. 1B
PRIOR ART

DOUBLE PRECISION FORMAT

LOGICAL
CONCEPT OF
ADDITION
IMPLEMENTED BY
ROUNDING DECODER 180 (FIG. 9)

FIG. 11

LOGICAL
CONCEPT OF
SUBTRACTION
IMPLEMENTED BY
ROUNDING DECODER 180 (FIG. 9)

HARDWARE ARRANGEMENT FOR FLOATING-POINT ADDITION AND SUBTRACTION

BACKGROUND OF THE INVENTION

1. Field of the Invention

The present invention relates generally to a hardware arrangement for implementing floating-point addition and/or subtraction, and more specifically to such an arrangement which enables an effective reduction of execution time of floating-point addition and/or subtraction with only a small increase in relatively simple hardware.

2. Description of the Prior Art

Floating-point arithmetic operations are more complicated than those with fixed-point numbers, take more time to execute, and require more complex hardware to implement. In most computers, arithmetic operations are implemented with normalized floating-point numbers. Therefore, all the numbers must be pre-normalized before they can be manipulated. After every intermediate computation step, a post-normalization procedure must be applied to ensure the integrity of the normalized form.

The subtraction and addition of floating-point numbers are implemented by the same arithmetic operations and accordingly, the addition will mainly be referred to throughout the instant specification.

The addition of floating-point numbers requires that the operands be "scaled" before the arithmetic operations are carried out so that they have equal exponents. Since the numbers are assumed to be initially normalized, scaling implies that the smaller number has to be shifted to the right until its exponent equals that of the larger number.

Addition is carried out by adding the two fractions, leaving the exponents untouched. When two normalized numbers are added, the result may contain an overflow digit. Correcting the overflow is accomplished by shifting the sum fraction once to the right, and incrementing the exponent value by 1. Similar algorithm is applicable to the subtraction of floating-point numbers.

In order to keep the precision of the floating-point number which is determined by the fraction length, "rounding" is implemented after normalizing the result of sum.

According to a paper entitled "IEEE Standard for Binary Floating-Point arithmetic (ANSI/IEEE Std 754-1985)" (hereinafter referred to as paper No. 1), published Aug. 12, 1985, several "rounding" modes have been proposed which will be described in later.

Figure 1A:
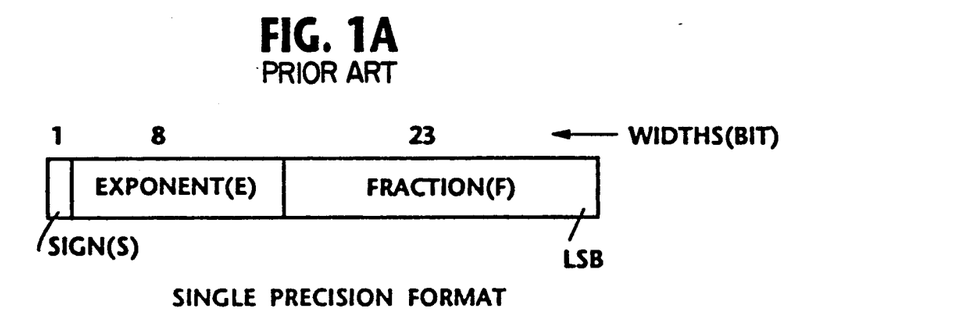
FIG. 1A is a diagram showing a floating-point data format which was referred to in prior art discussion set forth in the opening paragraphs of the instant specification.
Figure 1B:
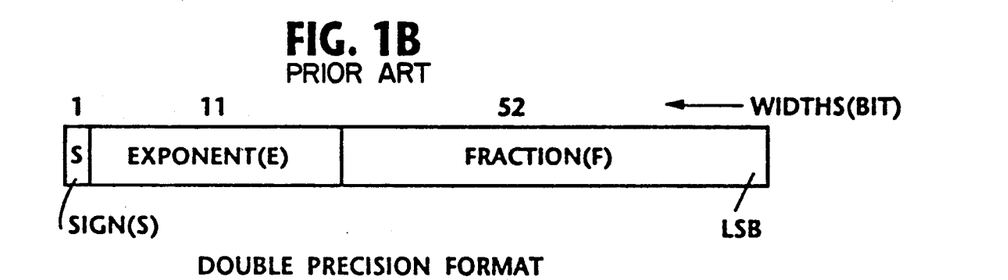
FIG. 1B is a diagram showing another floating-point data format which was referred to in the opening paragraphs of the instant specification.

FIG. 1A illustrates a single precision format (32 bits) in a floating-point number, while FIG. 1B a double precision format (64 bits) in same kind of number, both defined by the IEEE floating-point standard 754. The single- and double-precision formats use radix 2 for fractions and excess notation for exponents.

Each of the formats shown in FIGS. 1A, 1B starts with a sign bit (s) for the number as a whole, 0 being positive and 1 being negative. Next comes the exponent (E), using excess 127 for single precision and excess 1023 for double precision. A fraction (F) of 23 bits follows for the single precision format, and a fraction (F) of 52 bits for the double precision format. In FIGS. 1A, 1B, LSB is an abbreviation for Least-Significant Bit.

A general arithmetic algorithm for floating-point addition will briefly be described.

It is assumed that: (a) two floating-point numbers to be added are denoted by A and B as shown below, (b) $|A| \geq |B|$ (c) the sum is denoted by C.

$$A = (-1)^{Sa} \times 2^{(Ea-bias)} \times Fa$$
$$B = (-1)^{Sb} \times 2^{(Eb-bias)} \times Fb \tag{1}$$

where:
  Sa, Sb: sign bit;
  Ea, Eb: unbiased exponent; and
  Fa, Fb: fraction ($1.0 \leq Fa$, $Fb < 2.0$).

Then, $$C = A + B$$
$$= (-1)^{Sa} \times 2^{(Ea - bias)} \times Ft$$

where:

$$Ft = Fa + (-1)^{(Sa+Sb)} \times 2^{-(Ea-Eb)} \times Fb \tag{2}$$

In equation (2), the term $2^{-(Ea-Eb)}$ implies that two operands A and B are scaled before addition.

Since $0.0 \leq Ft < 2.0$, normalization is necessary for Ft.
It is understood that if $Ft = 0.0$ then $C = 0.0$.

Thus, defining Ft by $2^{-k} \leq Ft < 2^{-k+1}$ (k is an integer satisfying $-1 \leq k$), $$C = (-1)^{Sa} \times 2^{(Ea-bias-k)} \times (Ft \times 2^k) \tag{3}$$

Then, the sum C in equation (3) undergoes rounding.

Figure 2:
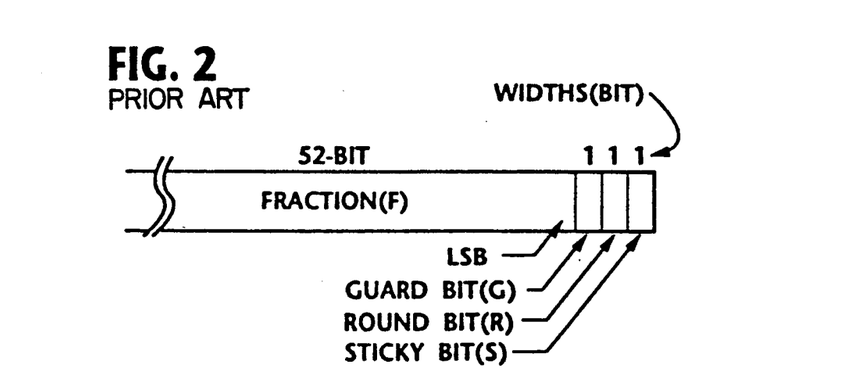
FIG. 2 is a block diagram showing floating-point data format during execution, this figure having been referred to in the opening paragraphs of the instant specification.

As discussed in a paper entitled "A Proposed Standard for Binary Floating-Point Arithmetic" (copyright 1981, IEEE), reprinted with permission from COMPUTER, 10662 Los Vaqueros Circle, Los Alamitos, Ca 90720 (hereinafter referred to as paper No. 2), the rounding defined by the above-mentioned IEEE floating-point standard 754 requires additional 3 bits (viz., guard, round and sticky bits) which are positioned to the right of the least-significant bit of the fraction F as shown in FIG. 2.

As mentioned in paper No. 2, the 3 bits affixed to LSB ensure accurate unbiased rounding of computed results to within half a unit in the least-significant bit. Two bits are required for perfect rounding: the guard bit is the first bit beyond rounding precision, and the sticky bit is the logical OR of all bits thereafter. To accommodate post-normalization in some operations, the round bit is kept, beyond the guard bit, and the sticky bit is a logical OR of all bits beyond round.

It is assumed that:
  (a) C is represented by $(-1)^{Sc} \times 2^{(Ec-bias)} \times Fc$; and
  (b) the fraction $(Ft \times 2^k)$ in equation (3) is rounded to n-bit fraction, then $$Sc = Sa$$
$$Ec = Ea - k$$
$$Fc = Fd \text{ (in the case of round-down)}$$
$$\quad = Fd + 2^{-(n-1)} \text{ (in the case of round-up)}$$

However, in the case where $Fd = 2.0 - 2^{-(n-1)}$ and a rounddown is carried out, then $Fc = 2.0$. Accordingly, $$Sc = Sa$$

$$Ec = Ea - k + 1$$

Fc=1.0

In the above-mentioned algorithm of floating-point addition, the absolute values of the numbers A and B are compared to determine which value is larger. However, as disclosed in a paper entitled "The IMB System/360 Model91: Floating-Point Execution Unit (IBM Journal, January 1967" (hereinafter referred to as paper No. 3), the comparison between the exponentials Ea and Eb prevails rather than that between |A| and |B|.

Before turning to the present invention, a known arrangement for floating-point addition (or subtraction) will be described with reference to FIG. 3. The FIG. 3 arrangement is configured based on the IEEE floating-point standard 754.

Merely for the convenience of description, it is assumed that:
 (a) the two floating-points numbers A and B as indicated in equation (1), are applied to the FIG. 3 arrangement 10;
 (b) each of the numbers A, B takes the form of double precision format (64-bit) and hence consists of one bit sign, an 11-bit exponent and a 52-bit fraction; and
 (c) the exponent Ea is larger than Eb.

Figure 3:
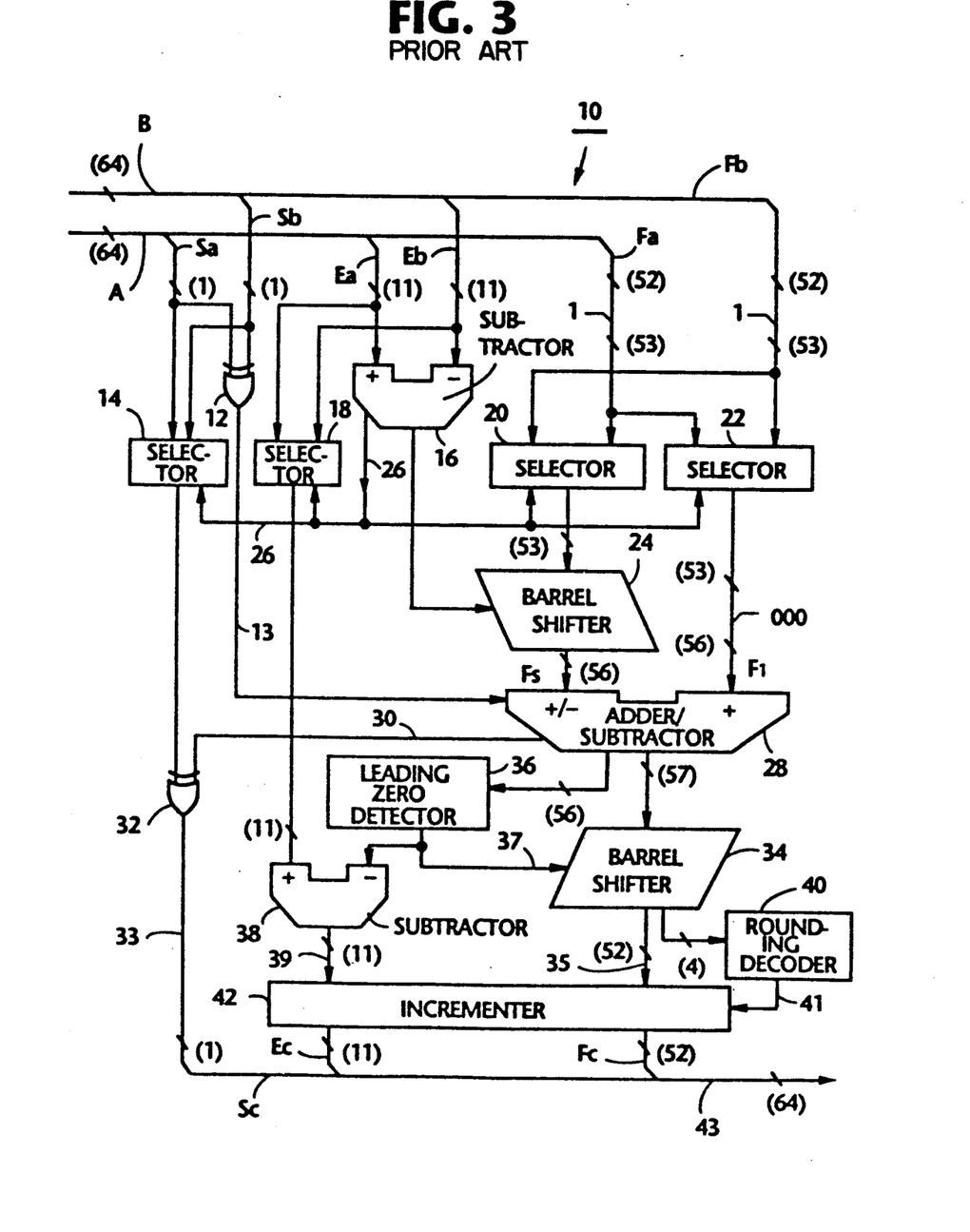
FIG. 3 is a block diagram showing the known arrangement which was discussed in the opening paragraphs of the instant specification.

In FIG. 3, each of the numbers parenthesized indicates a bit length. The sign bits Sa, Sb of the numbers A, B are inputted to an exclusive-OR gate 12 and a selector 14, while the exponents Ea, Eb of the number A, B are applied to a subtractor 16 and a selector 18. Further, the fractions Fa, Fb are added by "1" and then applied to selectors 20, 22, respectively. The subtractor 16 calculates |Ea−Eb| and applies the result thereof to a barrel shifter 24, and outputs a signal 26 indicating which is larger between Ea and Eb. The signal 26 is inputted to the selectors 14, 18, 20 and 22, As mentioned above, if Ea is larger than Eb, the selectors 14, 18 and 22 select Sa, Ea and Fa respectively, while the selector 20 selects Fb. (If Ea is smaller than Eb, the selectors 14, 18, 20 and 22 select the other one.)

The barrel shifter 24 is supplied with the exponent Eb (53-bit) from the selector 20 in that the exponent Ea has been assumed to be larger than the exponent Eb, and then adds three bits to the right of the LSB of the exponent Eb applied. The three bits thus added in the barrel shifter 24 are a guard bit (G), a round bit (R) and a sticky bit (S) as referred to in connection with FIG. 2. Thus, the output of the barrel shifter 24 has a 56-bit length. The barrel shifter 24 shifts the output of the selector 20 to the right by the value derived from the subtractor 16 (viz., (Ea−Eb)) for scaling of the exponents Ea, Eb. In order to conform to the bit length of the output of the barrel shifter 24, three zero bits (viz., 000 as illustrated) are added to the exponent Ea outputted from the selector 22 before being applied to an adder/subtractor 28.

It is assumed that the two inputs to the adder/subtractor 28 are denoted Fs and Fl as shown. In the event that the output 13 of the exclusive-OR gate 12 assumes 0 (viz., in the case of Sa=Sb), the adder/subtractor 28 implements addition (viz., Fs+Fl). On the other hand, if the gate 12 issues the output 13 assuming 1 (in the case where Sa does not equal Sb), the adder/subtractor 28 produces an output representing the result of (|Fl|−|Fs|). The adder/subtractor 28 adds one bit to the left of the most significant bit (MSB) thereof, and thus issues a 57-bit output. The adder/subtractor 28 further issues an output 30 to be applied to another exclusive-OR gate 32. The output 30 assumes 1 if the output 13 is 1 and simultaneously Fa<Fb. Otherwise, the output 30 assumes 0.

A barrel shifter 34 is supplied with the output of the adder/subtractor 28 (57-bit). On the other hand, a leading zero detector 36 receives the output of the adder/subtractor 28 (56-bit=57-bit−LSB), and counts up the number of leading zero(s). The detector 36 supplies the barrel shifter 34 with the output thereof (denoted by numeral 37) for normalization, which assumes a value ranging from −1 to 53. Thus, the barrel shifter 34 shifts the output applied from the adder/subtractor 28 to the left by the number of bits indicated by the output 37, thus implementing normalization. It should be noted that the lowest bit of the output from the adder/subtractor 28 remains at the position thereof irrespective of the bit shifting to the left at the barrel shifter 34. Further, a subtractor 38 receives the output 37 from the detector 36 and subtracts the output 37 from the exponent Ea in this particular case. Accordingly, the exponents Ea is adjusted in order to conform to the normalization carried out at the barrel shifter 34. Since an integer bit attached to the normalized fraction assumes 1, the output of the barrel shifter 34 includes a fraction only.

A rounding decoder 40 receives the least 4 bits of the normalized fraction from the barrel shifter 40, wherein the least 4 bits are the LSB of the fraction, the guard bit (G), the round bit (R) and the sticky bit (S) as best seen from FIG. 2. The rounding decoder 40 decodes the 4 bits applied thereto according to the default rounding mode which is defined by the IEEE floating-point standard 754, and issues an output 41. In more specific terms, this decoding is implemented according to the following Table 1.

TABLE 1

| LSB | G | OR(R,S) | Output of decoder 40 |
|---|---|---|---|
| x | 0 | 0 | 0 |
| x | 0 | 1 | 0 |
| 0 | 1 | 0 | 0 |
| 1 | 1 | 0 | 1 |
| x | 1 | 1 | 1 | where G is a guard bit, and OR(R,S) implies the result of OR function of round and sticky bits (R, S).

An incrementer 42 receives the output 35 of the barrel shifter 34 (viz., Fd−1.0), the output 39 of the subtractor 38 (viz., Ec) and the output 41 of the rounding decoder 40. If the output 41 assumes 1, the incrementer 42 issues a 64-bit output 43 plus $2^{-52}$. The 64-bit output 43 is:

(output 33 (=Sc))+(output 39 (=Ec))+(output 11 (Fc))

On the other hand, if the output 41 assumes 0, the output 43 is:

(output 33 (=Sc))+(output 39 (=Ec))+(output 11 (Fc))

The sign bit Sc is generated from the gate 32. In most cases the sign bit Sc equals the output of the selector 14. However, only in the event that Ea=Eb and Fa<Fb, even if Eb≦Ea, Fa<Fb. Accordingly, the gate 32 should be provided to which the signal 30 is applied as shown in FIG. 3.

Figure 4:
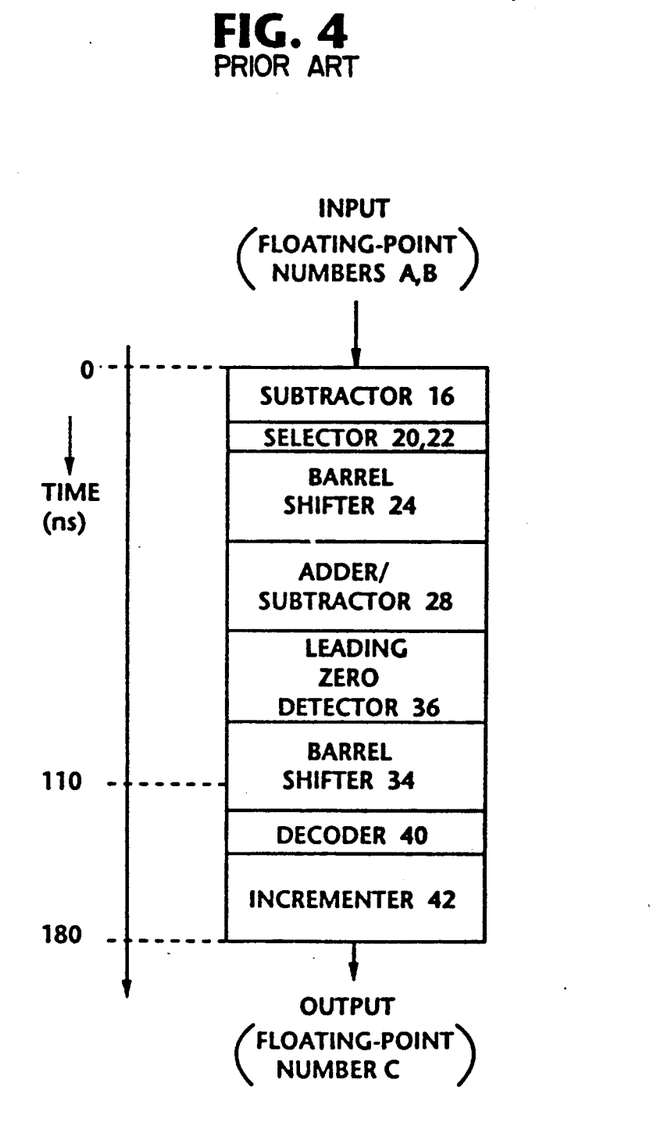
FIG. 4 is a diagram showing a critical path for execution in the FIG. 2 arrangement.

The operation time in the FIG. 3 arrangement will be discussed in the following. A critical path for executing the above-mentioned arithmetic operations is shown in FIG. 4. The operation times required at the blocks of the critical path shown are listed below.

| Subtractor 16 | 15 ns |
|---|---|
| Selectors 20, 22 | 5 ns |
| Barrel shifter 20 | 30 ns |
| Adder/subtractor 28 | 30 ns |
| Leasing zero detector 36 | 30 ns |
| Barrel shifter 34 | 30 ns |
| Rounding decoder 40 | 5 ns |
| Incrementer 42 | 35 ns |
| Total | 180 ns |

The known arrangement shown in FIG. 3 has encountered the problem that the total time of the operation along the critical path (FIG. 4) is undesirably lengthy. This is because carry propagation over long bit-length are required at the adder/subtractor 28 and the incrementer 42. Further, the incrementer 42 is unable to initiate its operation until the barrel shifter 24 completes the operation thereof. Still further, the two barrel shifting stages increases the overall execution time.

SUMMARY OF THE INVENTION

It is an object of this invention to provide a hardware arrangement for floating-point addition by which fast execution can be attained with a simple hardware configuration.

More specifically, the present invention comes in a hardware arrangement for executing floating-point execution of addition and subtraction, which is supplied with two floating-point numbers each of which includes an exponential, a fraction represented by an absolute value and a sign bit indicating a sign of the fraction, the hardware arrangement implementing rounding on an execution result, the hardware arrangement comprising: first means for implementing a floating-point execution wherein no bit shifting is needed for normalization on an execution result of the two floating-point numbers; second means for implementing a floating-point execution wherein bit shifting to the right or the left by one bit is required for normalization on an execution result of the two floating-point numbers; third means for implement a floating-point execution wherein bit shifting to the left by more than 2 bits is required for normalization on an execution result of the two floating-point numbers; and a selector being arranged to select an output of one of the first, second and third means; wherein the first, second and third means concurrently implement floating-point executions on the two floating-point numbers applied to the hardware arrangement, and wherein the selector carries out the selection according to upper bits of a result derived from executing the fractions at the first means.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Before discussing the preferred embodiment of the present invention in detail, the principle underlying the present invention will first be discussed.

Executions of floating-point number addition (or subtraction), can be divided into a plurality of operations, as shown in Table 2, according to the signs of the floating-point numbers and the differences of the exponents of the numbers to be executed.

TABLE 2

| T1 | T2 | T3 | T4 | T5 |
|---|---|---|---|---|
| Sa = Sb | 0 | right 1 | xx00 | no |
| Sa = Sb | 1 | right 1 | xxx0 | no |
| Sa = Sb | 1 | 0 | xx00 | possible |
| Sa = Sb | ≧2 | right 1 | xxxx | no |
| Sa = Sb | ≧2 | 0 | xxxx | possible |
| Sa ≠ Sb | 0 | left 1 | 0000 | no |
| Sa ≠ Sb | 0 | left 2 to n | 0000 | no |
| Sa ≠ Sb | 0 (Ma = Mb) | 0 | 0000 | no |
| Sa ≠ Sb | 1 | 0 | xx00 | no |
| Sa ≠ Sb | 1 | left 1 | x000 | possible |
| Sa ≠ Sb | 1 | left 2 to (n + 1) | 0000 | no |
| Sa ≠ Sb | ≧2 | 0 | xxxx | no |
| Sa ≠ Sb | ≧2 | left 1 | xx0x | possible | where the notations of T1-T5 and "x" are:
 T1: signs of Sa, Sa
 T2: difference of exponents (|Ea−Eb|)
 T3: bit-shift required for normalization
 T4: input bits to rounding decoder:
  (a) 1st bit—LSB of the fraction;
  (b) 2nd bit—guard bit;
  (c) 3rd bit—round bit; and
  (d) 4th bit—sticky bit
 T5: overflow into exponent.
 x:1 or 0

In Table 2, the bit-string assuming "0000" (T4) implies "round-down" without exception and hence no rounding is required.

Summing up, the above-mentioned conditions are classified into the followings.

(1) one bit shift to the right for normalization:
  (a) fraction: addition
  (b) the number of bit shift for scaling: $\geq 0$
  (c) rounding: necessary
  (d) overflow into exponent: no
(2) no bit shift for normalization:
  (a) fraction: addition
  (b) the number of bit shift for scaling: $\geq 0$
  (c) rounding: necessary
  (d) overflow into exponent: yes
(3) no bit shift for normalization:
  (a) fraction: subtraction
  (b) the number of bit shift for scaling: $\geq 0$
  (c) rounding: necessary
  (d) overflow into exponent: no
(4) one bit shift to the left for normalization:
  (a) fraction: subtraction
  (b) the number of bit shift for scaling: $\geq 0$
  (c) rounding: necessary
  (d) overflow into exponent: yes
(5) more than 2-bit shift to the left for normalization:
  (a) fraction: subtraction
  (b) the number of bit shift for scaling: 0 or 1
  (c) rounding: unnecessary
  (d) overflow into exponent: no Let us consider how to configure an arrangement for executing floating-point number addition for each of the above-mentioned conditions (1)–(5).

Regarding the conditions (1)–(4), both of round-up and round-down can be detected prior to the addition/-subtraction of the fractions in that the position of the scaling can be specified. This is because if the addition/-subtraction is performed only in the few bits including MSB, either the round-down and round-up during the roundoff operation can be determined. Accordingly, a carry save adder, which precedes an adder/subtractor for the fractions, is able to implement rounding. It follows that high speed execution can be attained.

In the case of the conditions (1)–(4), the barrel shifter for scaling is still necessary. However, the barrel shifter for normalization is no longer required.

On the other hand, in the case of the condition (5), although the barrel shifter for normalization is required, the barrel shifter for scaling can be omitted.

Still further, at the time point when the signs of the numbers applied are determined, the arrangements for the conditions (1)–(2) or (3)–(4) become unnecessary. Accordingly, a hardware arrangement prepared for the conditions (2)–(3) can be used in common. This advantage of common use of hardware is applicable to the conditions (1) and (4). Additionally, the subtractor 16 and the barrel shifter 24 for scaling can be used in common in the conditions (1)–(4).

In the following, preferred embodiments of the present invention will be discussed with reference to FIGS. 5 to 8. In the drawings, each of reference numerals in double parenthesis denote a bit number.

Figure 5:
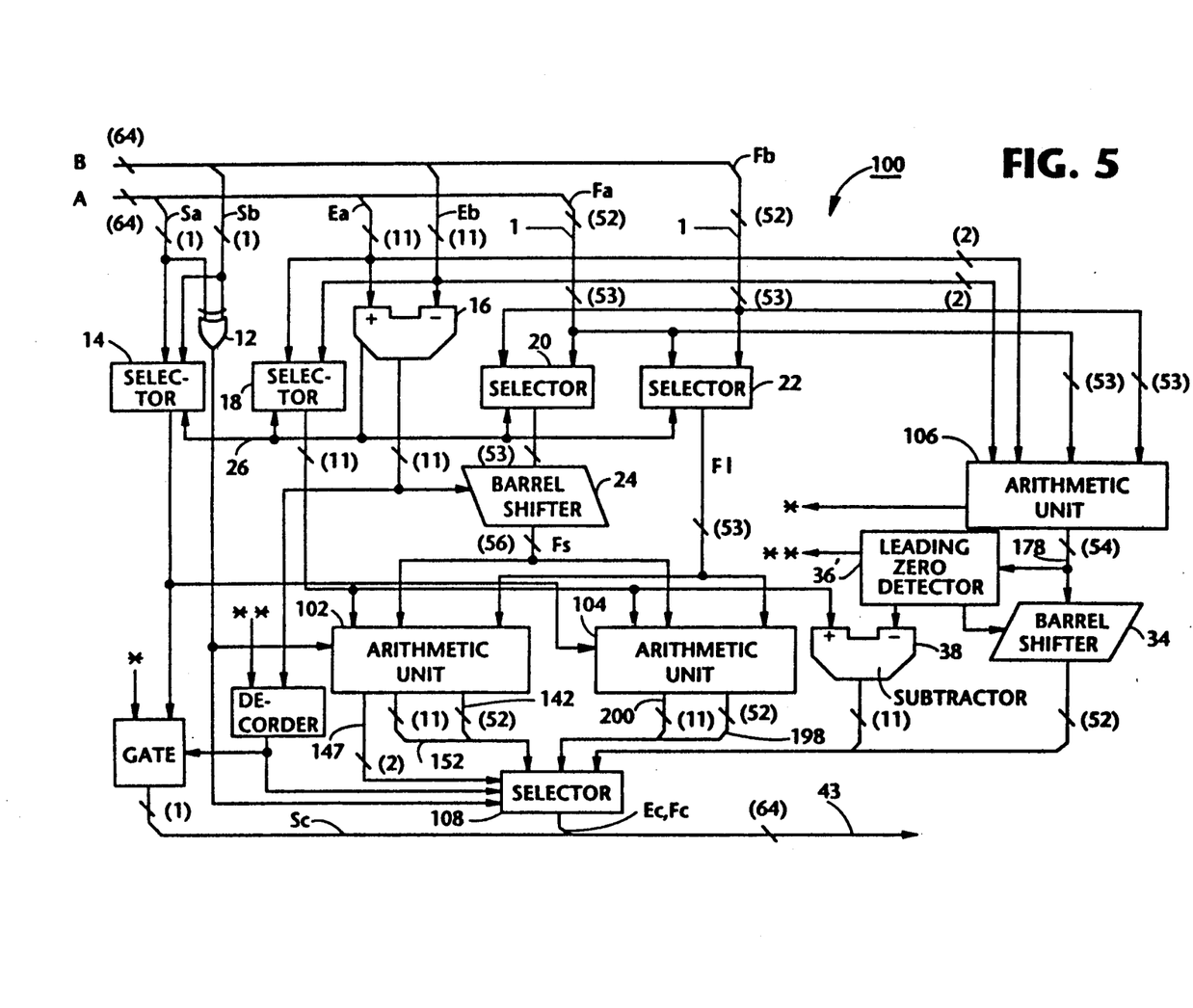
FIG. 5 is a block diagram showing the overall configuration of an embodiment of the present invention.

FIG. 5 is a block diagram showing an overall arrangement of a first embodiment of the present invention. The FIG. 5 arrangement includes blocks which are identical to those in the FIG. 3 arrangement and, hence like reference numerals are used to designate such blocks. That is, the blocks 14, 16, 18, 20, 22, 24, and 34 are used in both of the arrangements of FIGS. 3 and 5. Since these blocks have been referred to in the opening paragraphs, the descriptions thereof will be omitted for the sake of brevity. Further, a leading zero detector 36' in FIG. 5 is similar in configuration to the block 36, so that a prime is attached to the counterpart of the FIG. 5 arrangement.

As shown, the FIG. 5 arrangement includes three arithmetic units 102, 104 and 106.

In general, the unit 102 is provided for implementing arithmetic operations of addition/subtraction of fractions and subsequent rounding in the event that no bit shifting is needed for normalization. Namely, the unit 102 carries out the operation as referred to in the above-mentioned condition (2), (3). The arithmetic unit 104 implements addition/subtraction of exponents and rounding when one bit shift is required to the right or left for normalization. The unit 104 carries out the operation as mentioned to in the aforesaid conditions (1), (4). On the other hand, scaling (viz., alignment) and subtraction of fractions are implemented by the unit 106 if more than 2 bits should be shifted to the left for normalization as referred to in the condition (5). The exponent comparison and scaling, which are common in the operations of the conditions (1)–(4), are performed by the subtractor 16, the selectors 14, 18, 20 and 22 and the barrel shifter 24.

The arithmetic unit 102 receives the outputs of the barrel shifter 24 and the selector 22 (viz., Fs and F1), and receives the output of the selector 18. The unit 102 implements addition (Fs+F1) when the output of the gate 12 assumes 0, and carries out subtraction (|F1−Fs|) including the rounding.

Figure 6:
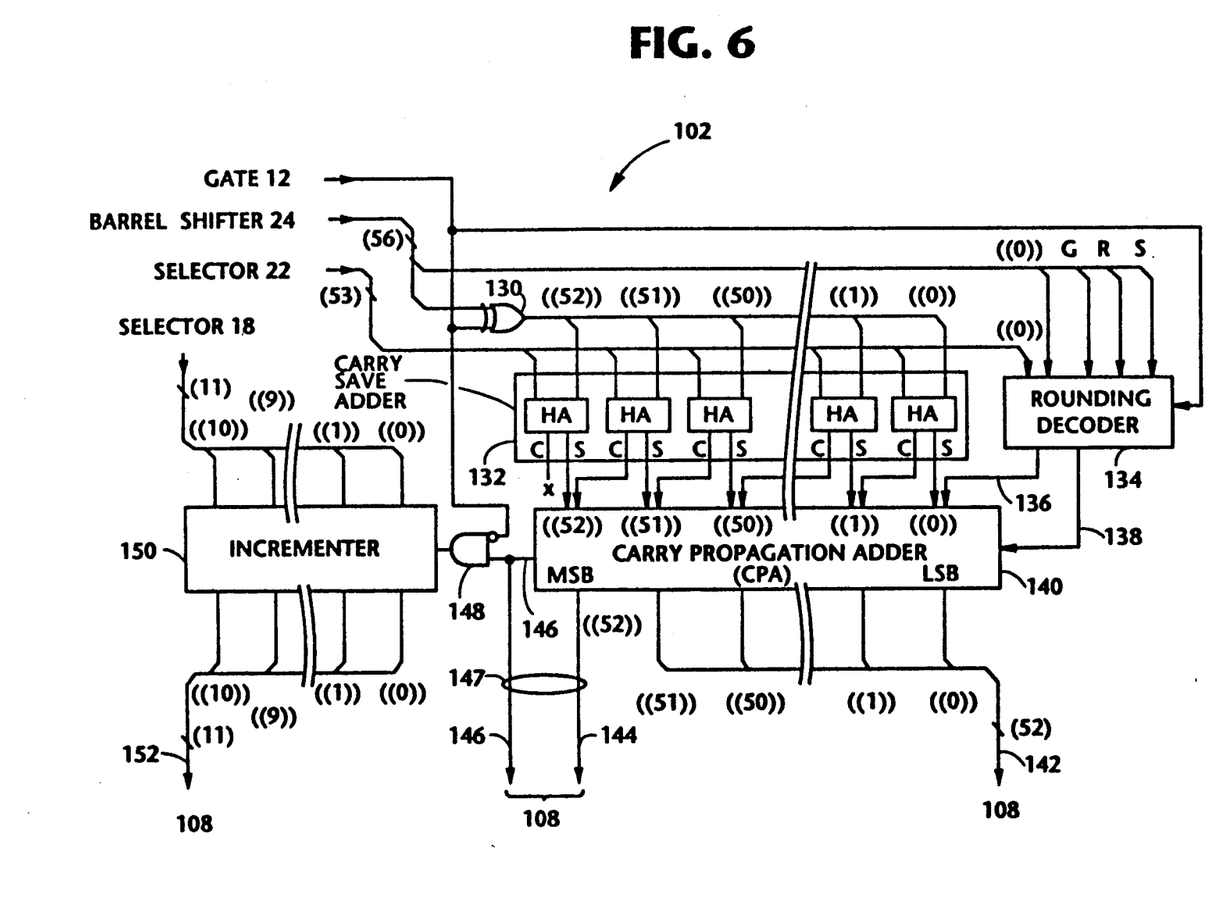
FIG. 6 is a block diagram showing details of an arithmetic unit which forms part of the arrangement shown in FIG. 5.

FIG. 6 is a block diagram showing in detail the arithmetic unit 102 of FIG. 5. In FIG. 6, an exclusive-OR gate 130 reverses the output of the barrel shifter 24 in response to the output of the gate 12. A carry save adder 132 takes the form of a 53-bit adder and includes a plurality of half-adders, and receives the outputs of the gate 130 and the selector 22. A rounding decoder 134 is arranged to receive the outputs of the selector 22 and the gate 12, and further receives the least 4 bits of the barrel shifter 24. The rounding decoder 134 generates a control signal 136 which indicates a carry due to rounding, and further issues a control signal 138 representing a carry in the case of subtraction. A carry propagation adder (CPA) 140 is arranged to add the outputs of the carry save adder 132. On the other hand, an output signal 142 includes the lower 52 bits of the carry propagation adder 140, and is applied to a selector 108 (FIG. 5). Another output signal 144 indicates the MSB of the adder 140, while an output signal 146 is a carry signal from the MSB of the adder 140. The output signals 144, 146 are applied to the selector 108 as an output signal 147. An exclusive-OR gate 148 is supplied with the output of the gate 12 and the signal 146 and detects the overflow of the fraction due to rounding. The output of the gate 148 is applied to an incremeter 150 which adds 1 to the output of the selector 18 in response to the output of the gate 148. The incrementer 150 issues an output signal 152 (11 bits) which is applied to the selector 108.

The carry propagation adder (CPA) 140 implements addition only. However, in the case where subtraction should be performed, the output (Fs) of the barrel shifter 24 is reversed at the exclusive-OR gate 130, and the output of the gate 12 is applied to the rounding decoder 134.

Figure 7:
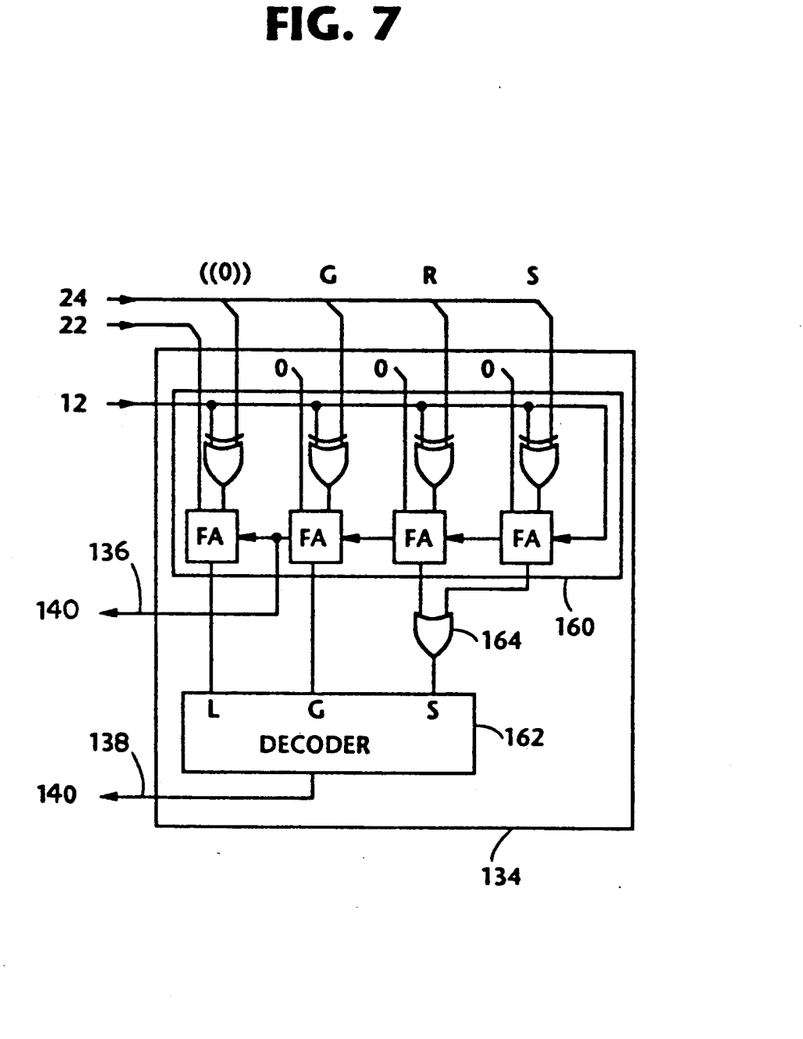
FIG. 7 is a block diagram showing details of a rounding decoder used in the FIG. 5 arrangement.

In more specific terms, FIG. 7 illustrates the detail of the rounding decoder 134 which includes an adder/subtractor 160, a decoder 162 and an OR gate 164. The adder 160 is comprised of a plurality of exclusive-OR gates and a plurality of full-adders (FA), which implement addition or subtraction of the output of the selector 22 in response to the output of the gate 12. The gate 164 implement OR function on round bit (R) and sticky bit (S) of the adder/subtractor 160. The output of the gate 12 supplies LSB of the adder/subtractor 160 with 1, and thus the CPA 140 implements subtraction. The rounding can be performed at the carry save adder 132 (FIG. 6) merely by adding 1 or 0 to LSB of the fraction. Accordingly, the carry save adder 132 is able to implement the rounding using the half-adders. After carrying out subtraction of the fractions, the rounding decoder 134 issue the control signals 136, 138, which are applied to the bit position No. 0 of the CPA adder 140 (viz., applied to rounding position).

Figure 8:
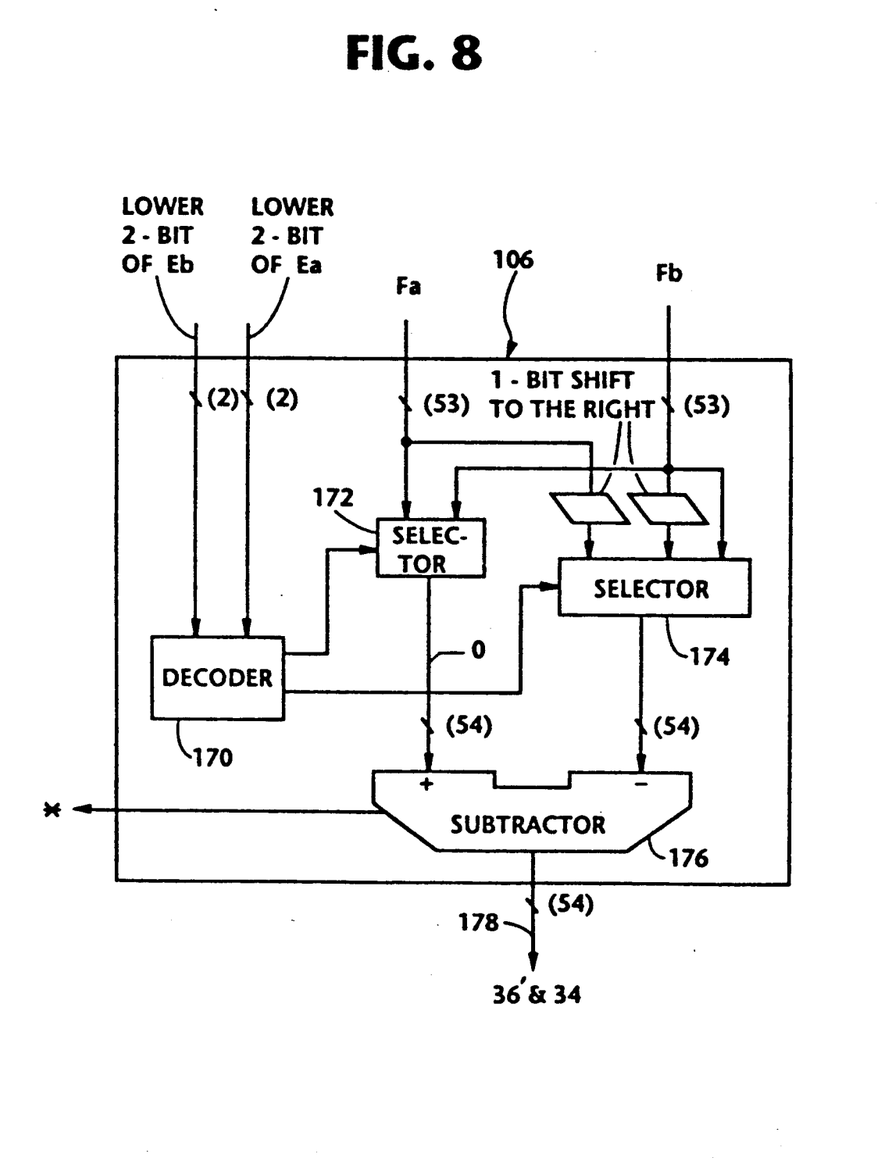
FIG. 8 is a block diagram showing details of a first arithmetic unit utilized in the FIG. 5 arrangement.

FIG. 8 is a block diagram showing the arithmetic unit 106 in detail. In FIG. 8, a decoder 170 is supplied with lower two bits of each of the inputted floating-point numbers A, B. A selector 172 selects one of the fractions Fa, Fb in response to the output of the decoder 170, while another selector 174 selects one of the fractions Fa, Fb after being shifted to the right by 1-bit. On the other hand, a subtractor 176 determines a difference of the absolute values of the outputs of the selectors 172, 174, and issues a signal 178 which is fed to the leading zero detector 36' and the barrel shifter 34.

Figure 9:
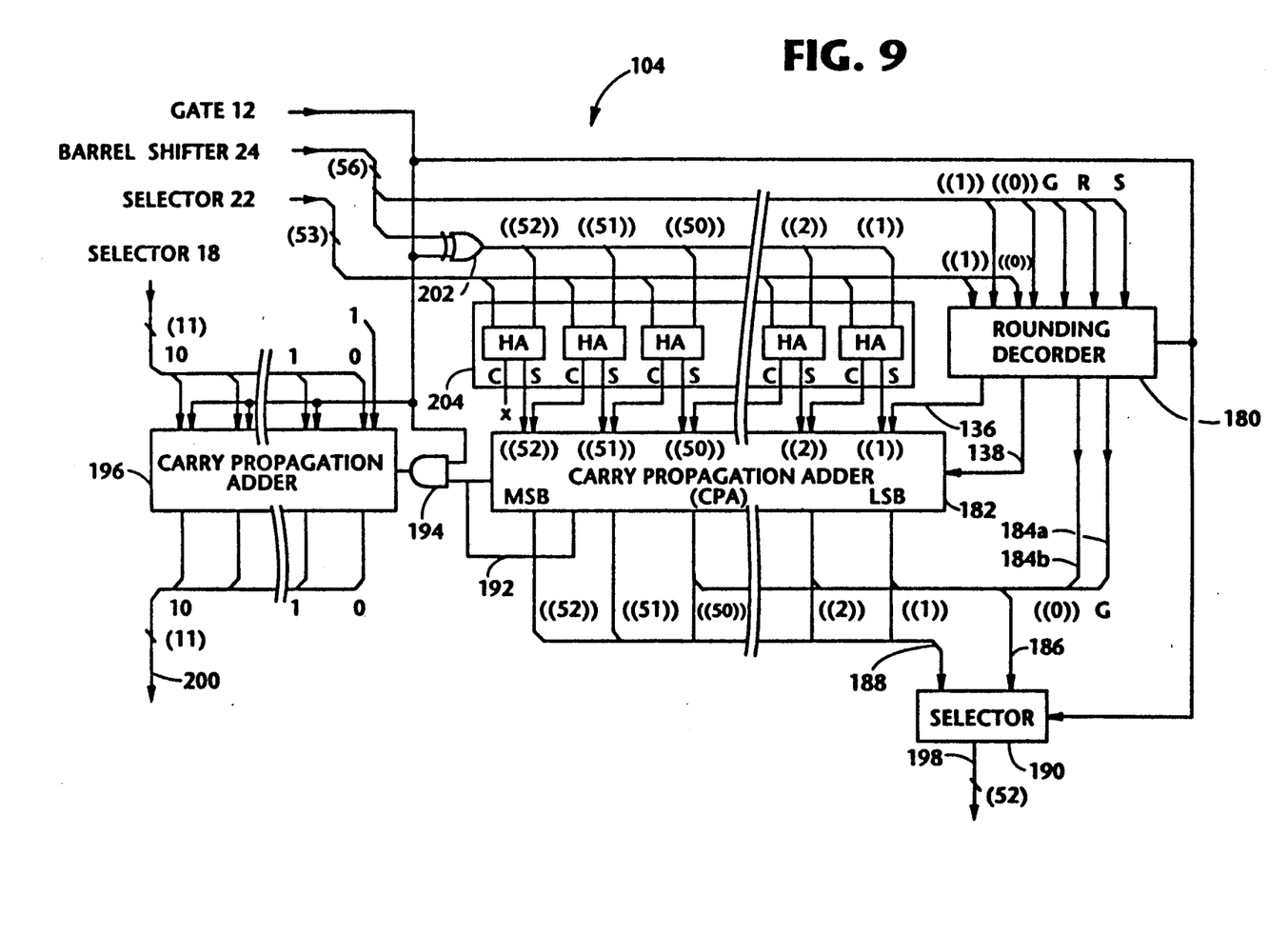
FIG. 9 is a block diagram showing details of a second arithmetic unit utilized in the FIG. 5 arrangement.

FIG. 9 is a block diagram showing the arithmetic unit 104 in detail. In FIG. 9, a rounding decoder 180 is supplied with the output of the gate 12 and lower bits of each of the barrel shifter 24 and the selector 22. A carry propagation adder 182 is similar to its counterpart 140. Signals 184a, 184b represent respectively a guard bit (G) and LSB, both of which indicate the result of the subtraction of the fractions and are issued from the decoder 180. The signals 184a, 184b are combined with lower 51 bits of the output of the carry propagation adder 182. The combined signal is applied to a selector 190 as a signal 186. On the other hand, a signal 188 indicates upper 52 bits of the output of the adder 182. A selector 190 receives the signal 186, 188 and select one of them in response to the output of the gate 12 applied thereto. The adder 182 issues a carry signal 192 which is applied to an OR gate 194. This gate 194 is further supplied with the output of the gate 12, and detects an overflow of the fraction due to rounding. A carry propagation adder 196 is arranged to add +1 or −1 to the output of the selector 18 in response to the output of the OR gate 194, and issues the result as a signal 200. An exclusive OR gate 202 and a carry save adder 204 correspond respectively to the counterparts 130 and 132 shown in FIG. 6.

Figure 10:
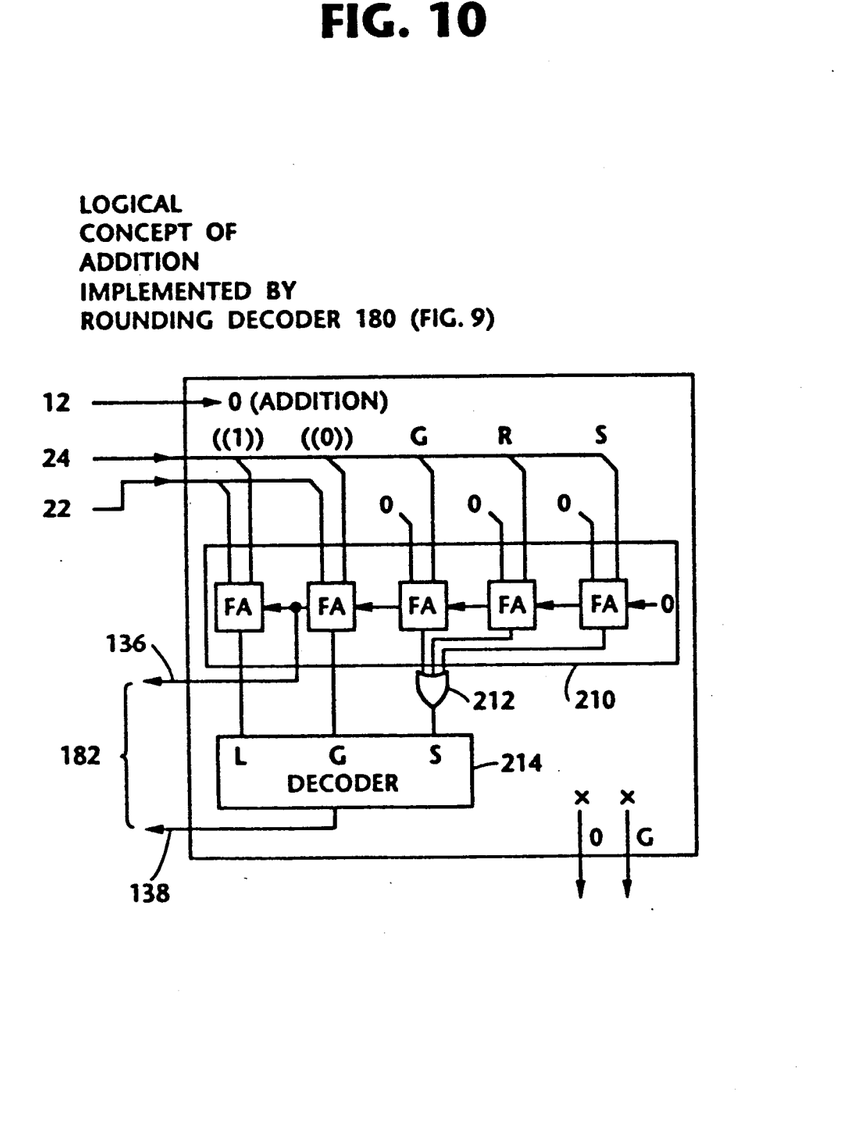
FIGS. 10 and 11 are views depicting the logical arrangements employed a rounding decoder of the FIG. 5 arrangement, during addition and subtraction, respectively.
Figure 11:
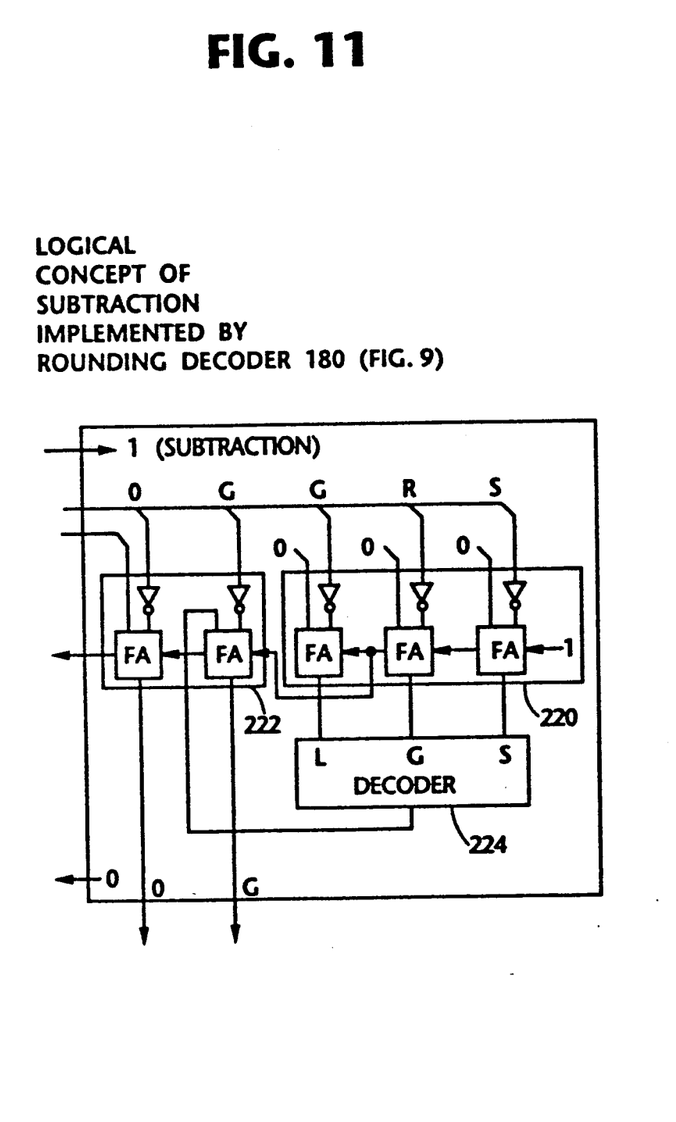

FIGS. 10 and 11 are logic arrangements which respectively indicate logical concepts of addition and subtraction carried out by the rounding decoder 180 shown in FIG. 9.

The arrangement shown in FIG. 10 includes an adder 210, an OR gate 212 and a decoder 214. The OR gate 212 performs a logical function on the guard, round and sticky bits, and applies the output thereof to one of three inputs of the decoder 214. On the other hand, the arrangement shown in FIG. 11 includes two subtractors 220, 222 and a decoder 224.

While the foregoing description describes only one embodiment of the present invention, the various alternatives and modifications possible without departing from the scope of the present invention, which is limited only by the appended claims, will be apparent to those skilled in the art.

What is claimed is:

1. A hardware arrangement for executing floating-point execution of addition and subtraction, which is supplied with two floating-point numbers each of which includes an exponential, a fraction represented by an absolute value and a sign bit indicating a sign of the fraction, the hardware arrangement implementing rounding on an execution result, the hardware arrangement comprising:

first means for implementing a floating-point execution wherein no bit shifting is needed for normalization on the execution result of the two floating-point numbers, said first means determining either round-down or round-up prior to implementation of addition and subtraction of fractions and then carrying out addition and subtraction of the fractions and simultaneously rounding;

second means for implementing a floating-point execution wherein one bit shifting to the right or the left is required for normalization on the execution result of the two floating-point numbers, said second means determining either round-down or round-up prior to implementation of addition and subtraction of fractions and then carrying out addition and subtraction of the fractions and simultaneously rounding;

third means for implement a floating-point execution wherein two bits or more that two bits shifting to the left is required for normalization on the execution result of the two floating-point numbers; and a selector being arranged to select an output of one of the first, second and third means;

wherein the first, second and third means concurrently implement floating-point executions on the two floating-point numbers applied to the hardware arrangement, and wherein the selector carries out the selection according to upper bits of a result derived from executing the fractions at the first means.

2. A hardware arrangement as claimed in claim 1, wherein, in the case where two sign bits of the two floating-points applied to the hardware arrangement are equal with each other, the second means implements a floating-point addition in which normalization is performed by shifting one bit to the right, and wherein in the case where two sign bits of the two floating-points applied to the hardware arrangement are different, the second means implements a floating-point addition in which normalization is performed by shifting one bit to the left.

3. A hardware arrangement as claimed in claim 1, wherein each of the first and second means is provided with a shifting means the function of which is limited to one bit shifting to the left.

4. A hardware arrangement as claimed in claim 1, further comprising:

magnitude determining means for determining which is larger between the two floating-point numbers applied to the hardware arrangement; and bit shifting means for shifting a bit sequence to the right by a given number of bits, wherein the first and second means share the magnitude determining means and the bit shifting means.

5. A hardware arrangement as claimed in claim 1, wherein the third means is provide with a shifting means the function of which is limited to one bit shifting to the right.

6. A hardware arrangement as claimed in claim 1, wherein the third means is provided with no rounding means.

7. A hardware arrangement as claimed in claim 1, wherein the selector is controlled by a difference of the fractions of the two floating-point numbers applied to the hardware arrangement, an exclusive-OR of the sign bits, and part of the fraction outputted from the first means.

* * * * *